Figure 1:
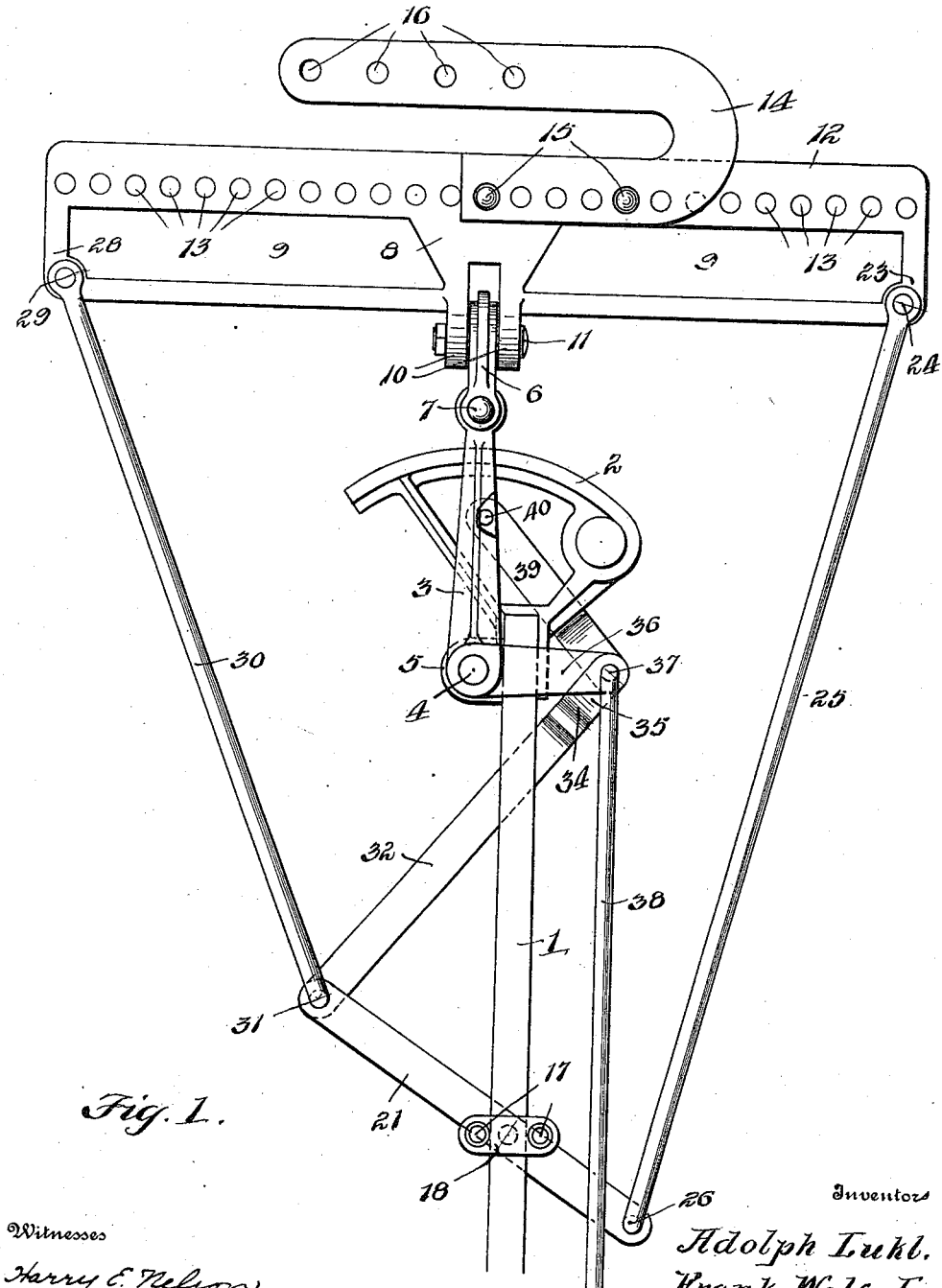

A. LUKL & F. WOLF, Jr.
SIDE DRAFT EQUALIZER FOR SULKY PLOWS.
APPLICATION FILED AUG. 9, 1909.

976,385.

Patented Nov. 22, 1910.

4 SHEETS—SHEET 1.

Witnesses
Harry E. Nelson
T. O. Thompson

Inventors
Adolph Lukl.
Frank Wolf Jr.
By Fred J. Ramon
Attorney

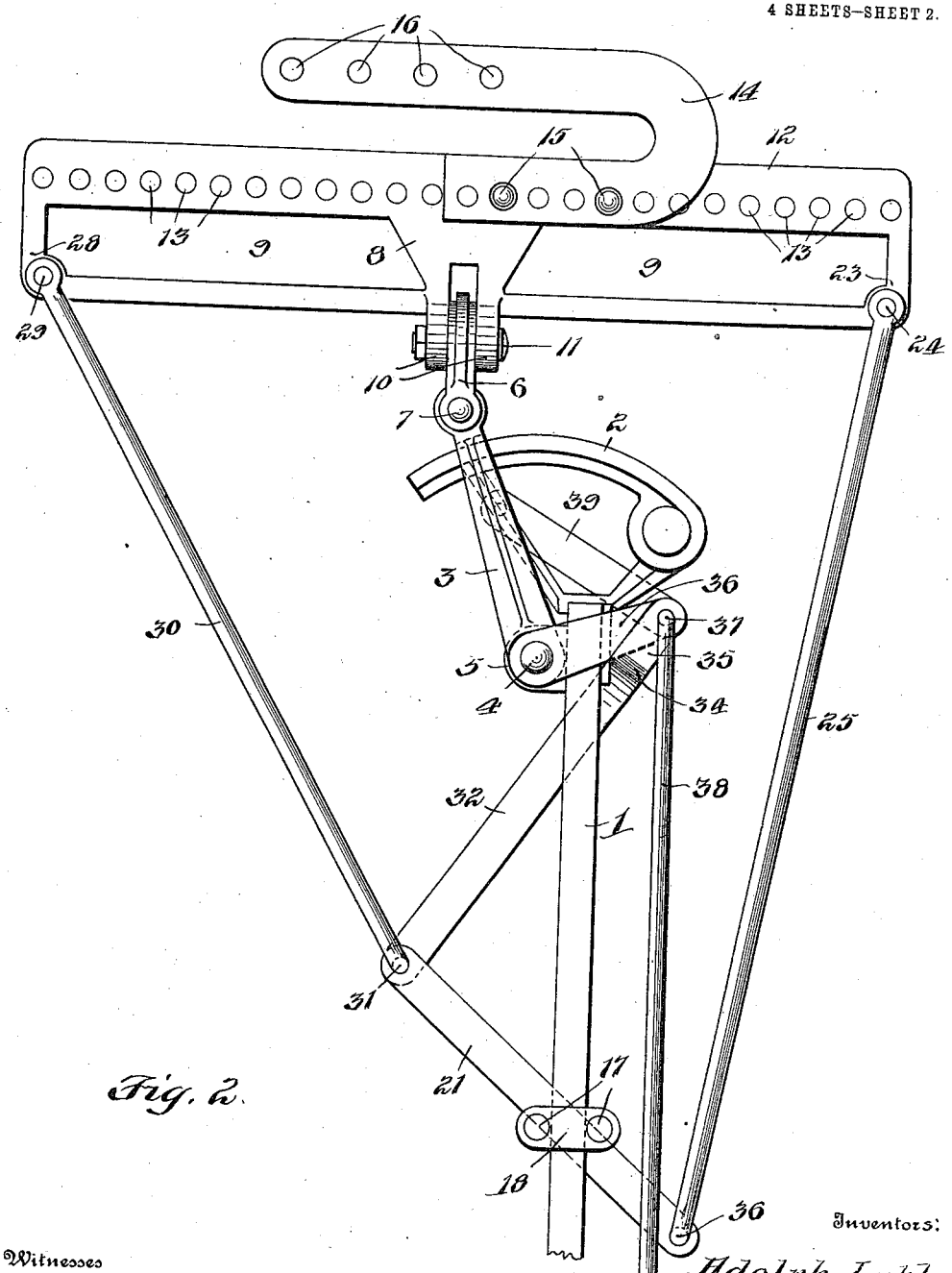

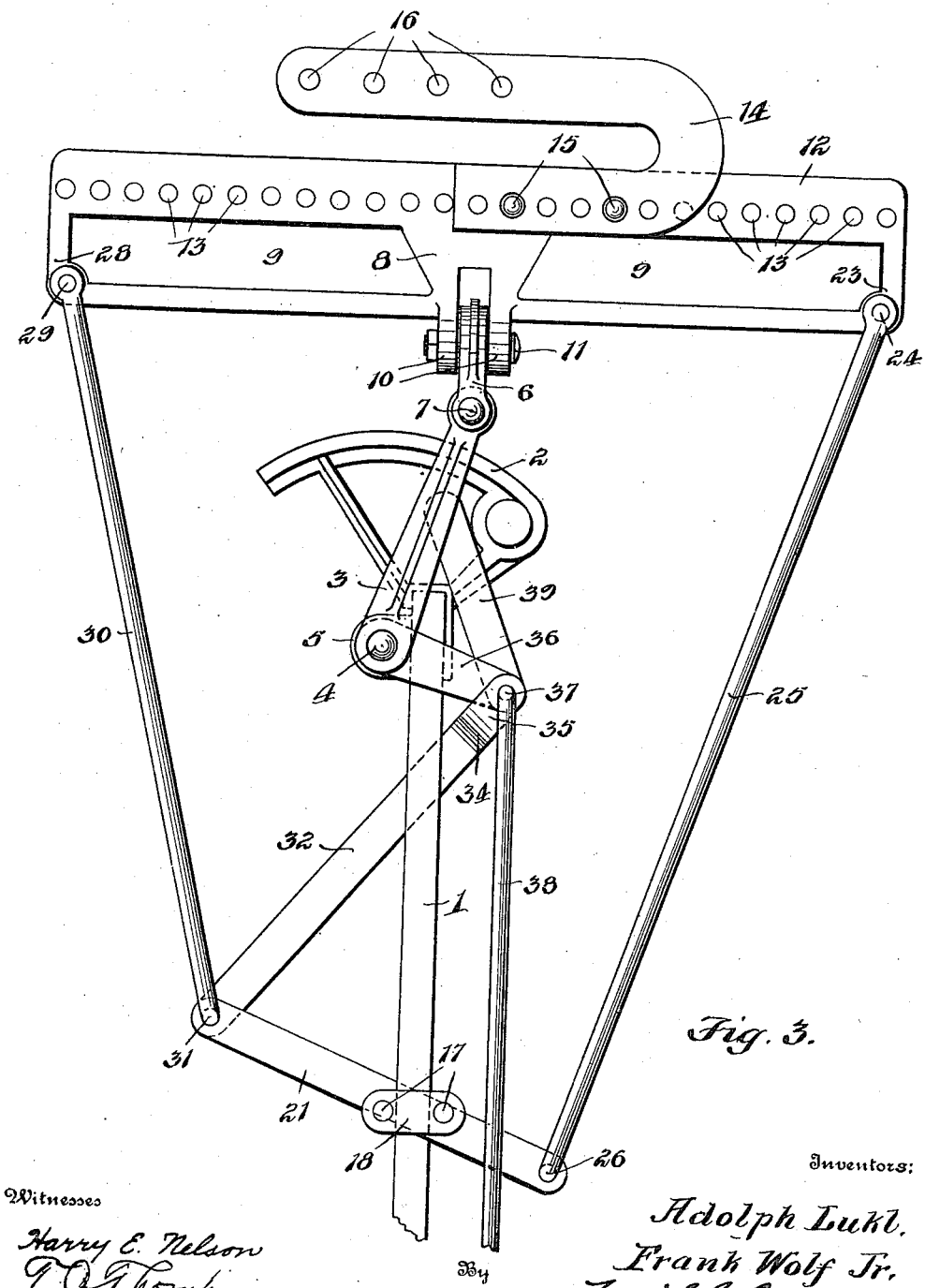

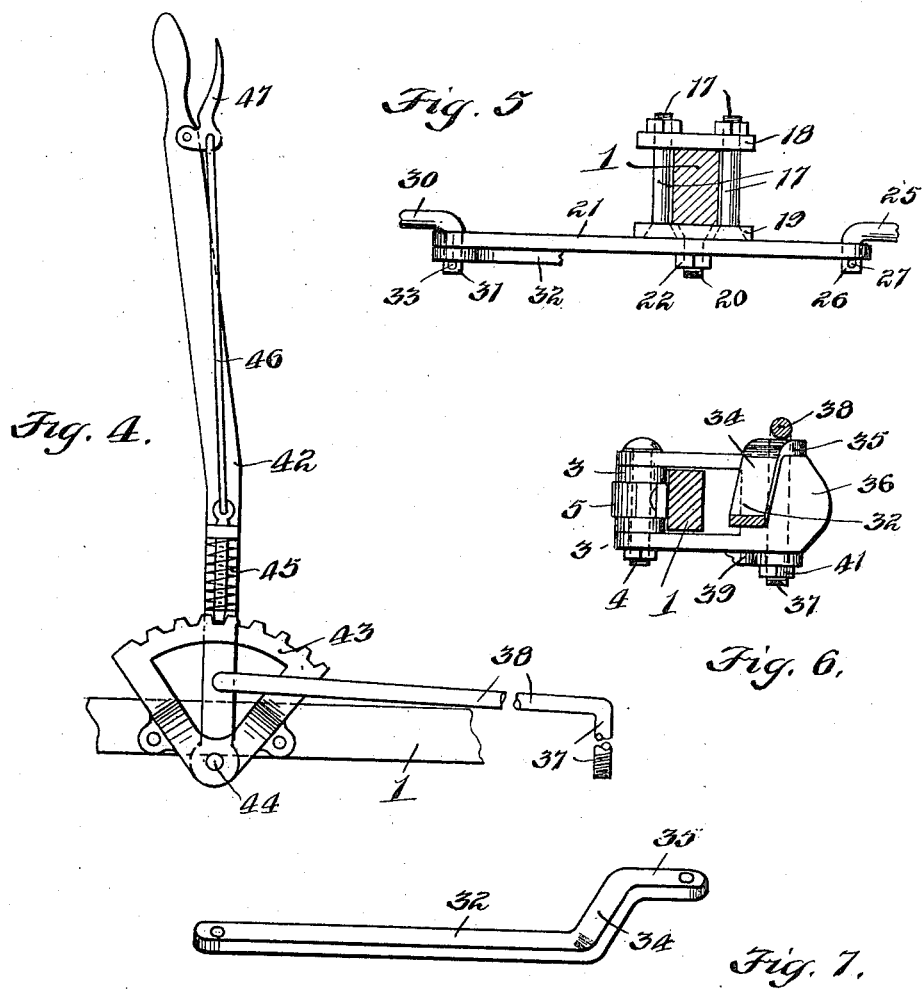

UNITED STATES PATENT OFFICE.

ADOLPH LUKL AND FRANK WOLF, JR., OF CLARKSON, NEBRASKA.

SIDE-DRAFT EQUALIZER FOR SULKY-PLOWS.

976,385. Specification of Letters Patent. Patented Nov. 22, 1910.

Application filed August 9, 1909. Serial No. 511,900.

*To all whom it may concern:*

Be it known that we, ADOLPH LUKL and FRANK WOLF, Jr., citizens of the United States, and residents of Clarkson, in the county of Colfax and State of Nebraska, have invented certain new and useful Improvements in Side-Draft Equalizers for Sulky-Plows, of which the following is a full, clear, and exact description, such as will enable others skilled in the art to which it appertains to make and use the same.

Our invention relates to equalizer attachments for sulky plows, and has for its object to provide a device of this character which will be simple and inexpensive as well as durable and efficient.

A further object of our invention is to provide an attachment which will take off all side-draft when plowing, regardless of the number of animals employed to pull the plow, which object we accomplish by providing means for moving or shifting the clevis to the left or right of the plow-beam so as to keep it at all times in alinement with the animals.

It is of course understood that our invention may be made of any suitable material and of any size, and that various changes in the form, proportion and minor details of construction may be resorted to without departing from the principle or sacrificing any of the advantages of the invention.

With the above and other objects in view our invention consists in the novel construction, arrangement and combination of parts as will be more fully hereinafter described and finally pointed out in the claims hereto appended.

Referring to the accompanying drawings forming a part of this specification wherein like characters of reference denote similar parts throughout the several views: Figure 1, is a plan view of our improved equalizer attachment showing the same attached to the end of a plow-beam, the attachment being shown in its normal position. Fig. 2, is a plan view of the attachment showing the clevis moved or shifted slightly to the left of its central or normal position. Fig. 3, is a plan view of the attachment showing the clevis moved or shifted slightly to the right of its central or normal position. Fig. 4, is a detail clearly showing the operating lever which is connected to the plow-beam for actuating the attachment. Fig. 5, is a detail clearly showing the means employed for pivotally connecting the rock-bar or lever to the underside of the plow-beam. Fig. 6, is a detail showing the arm which is suitably connected to the rear end of the swinging clevis. Fig. 7, is a detail of the member for connecting the free end of the arm with the left hand end of the rock-bar. Fig. 8, is an end view of the clevis showing the same connected to the vertical link.

Referring to the accompanying drawings the reference character 1 designates a sulky plow-beam, and 2 a guide or stationary clevis which is rigidly secured to the end of the plow-beam.

The reference character 3 designates a swinging clevis which is pivotally connected by means of the bolt 4 to the ear or lug 5 secured to the side of the plow-beam, and 6, designates a suitable vertically disposed link adapted to be pivotally connected to the forward end of the swinging link by means of the bolt 7.

In carrying out the aim of our invention, we employ a peculiarly shaped clevis 8 having the oppositely disposed elongated openings 9, and the rearwardly extending ears 10. The clevis 8 is adapted to be horizontally disposed and pivotally connected to the vertically disposed link 6 by means of the bolt 11.

The front body portion 12 of the clevis 8 it will be observed is provided with a plurality of alined openings 13. Adapted to seat upon the upper face of the body portion 12 of the clevis 8 is a substantially J-shaped element 14, the short end of which is secured by means of the bolts 15 to the clevis 8 and the long or free end thereof is provided with a plurality of suitable spaced openings 16 adapted to receive a bolt or the like for the purpose of pivotally connecting an evener or equalizer thereto. The J-shaped element 14, it will be observed may be secured at any desired point upon the clevis 8 and is adapted to assist in taking off all the side-draft.

Clamped to the plow-beam 1 at any desired point to the rear of the swinging clevis 3 by means of the bolts 17 is an upper plate 18 and a lower plate 19. Passing downwardly through the lower plate 19 is a bolt 20 to which is pivotally connected a horizontally disposed rock-bar or lever 21. This rock-bar or lever is held in place by means of the nut 22, as clearly shown in Fig. 5.

Pivotally connected to the rear right hand corner 23 of the clevis 8, by means of the bolt 24 is a guide rod 25 which has its opposite end bent at a right angle as at 26 and is adapted to pass through the short or right hand end of the rock-bar or lever 21 and is prevented from working out by means of the pin 27.

Pivotally connected to the rear left hand corner 28 of the clevis 8 by means of the bolt 29 is a guide rod 30 of less length than guide rod 25, which has its opposite end bent at a right angle as at 31 and adapted to pass through the long or left hand end of the rock-bar or lever 21 and also through the rear end of the strap iron member 32, as clearly shown in Figs. 1, 2, 3, and 5. This right angular end 31 it will be observed acts as a pivot and is prevented from working out and allowing the rear end of the strap iron member 32 from falling down by means of a cotter-pin 33 or the like.

The strap iron member or link 32 it will be observed has its forward end bent upwardly as at 34 and finally forwardly as at 35 as clearly shown in Fig. 7. The forward end of this member or link 32 is pivotally connected with the outer end of the arm 36 by means of the right angular end 37 of the connecting rod 38 which passes downwardly therethrough, as clearly shown in Fig. 6.

Connecting the outer end of the arm 36 with an intermediate point of the swinging clevis 3 is a link 39 which is held in position at one end by means of the pin 40 and at the opposite by means of the right angular end 37 of the connecting rod 38 which passes through the same. The lower end of the right angular end 37 is provided with any suitable securing device, such as a nut 41 or if desired a cotter-pin or the like.

The connecting rod 38 is pivotally connected at its end opposite the right angular end 37 to an operating lever 42. This lever 42 is pivotally connected to the lower end of a notched sector 43, as at 44, which sector 43 is suitably secured to the plow-beam 1, as clearly shown in Fig. 4. The lever 42 is provided with the usual spring held pin 45, which is actuated by means of the rod 46, which at its upper end is connected to the pivotally held operating handle 47. The operation of our device is as follows: When the operating lever 42 is standing in its normal position as clearly shown in Fig. 4, of the drawings, the clevis 8 is held at a right angle to the plow-beam and with the swinging clevis 3, as clearly shown in Fig. 1. Now, when the operating lever 42 is thrown or pushed forward the guide rods move or shift the clevis 8 to the left of the pivot 4, as clearly shown in Fig. 2, thereby causing the plow to take more land and at the same time the clevis 8 is held in alinement with the horses and at a right angle to the plow-beam, but not with the swinging clevis 3 as is the case when the attachment is standing in its normal or central position, as shown in Fig. 1. When the operating lever 42 is thrown or pulled rearwardly the guide rods move or shift the clevis 8 to the right of the pivot 4 thereby causing the plow to take less land and at the same time keep the clevis 8 at a right angle to the plow-beam, as clearly shown in Fig. 3.

It will be readily seen and understood, no matter how far the operating lever 42 is moved, one way or the other, that the clevis is always in alinement with the animals and at a right angle to the plow-beam. The clevis is simply moved or shifted to the left or right of the pivot 4, as clearly shown in Figs. 2 and 3.

What we claim is:—

1. In an attachment of the class described, the combination with a plow-beam having a swinging clevis connected thereto, of a vertically disposed link pivotally connected to said swinging clevis, a horizontally disposed clevis pivotally connected to said vertically disposed link having a plurality of alined openings therein, a substantially J-shaped element removably secured to said clevis, and means for keeping said horizontally disposed clevis in alinement with the draft.

2. In an attachment of the class described, the combination with a plow-beam having a swinging clevis connected to the forward end thereof, of a vertically disposed link pivotally connected to the free end of said swinging clevis, a horizontally disposed clevis having a plurality of alined openings therein, means for pivotally connecting said clevis with said vertically disposed link, a pivotally held rock-bar, guide rods connecting the ends of said rock-bar with the rear corners of said horizontally disposed clevis, and means for actuating said rock-bar for keeping said horizontally disposed clevis in alinement with the draft.

3. In a device of the class described, the combination with the beam of a sulky-plow having a swinging clevis connected to the forward end thereof, of a vertically disposed link pivotally connected to the free end thereof, a horizontally disposed clevis pivotally connected to said vertically disposed link, an adjustable J-shaped element secured to said horizontally disposed clevis, and means for shifting said clevis to the left or right of the plow-beam.

4. In a device of the class described, the combination with a plow-beam having a swinging clevis connected to the forward end thereof, of a vertically disposed link pivotally connected to said swinging clevis, a horizontally disposed clevis pivotally connected to said vertically disposed link, a substantially J-shaped element having a plurality of openings therein adapted to be removably secured to said horizontally disposed clevis, a pivotally held rock-bar having connection with said horizontally disposed clevis, and means for actuating said rock-bar and said horizontally disposed clevis simultaneously.

5. In a device of the class described, the combination with a plow-beam having a swinging clevis connected to the forward end thereof, of a vertically disposed link, a horizontally disposed clevis, means for pivotally connecting said clevis with said link, a horizontally disposed rock-bar pivotally connected to the under side of said plow-beam, guide rods connecting said rock-bar with said horizontally disposed clevis, and means for operating said rock-bar and horizontally disposed clevis in unison.

6. In a device of the class described, the combination with a plow-beam having a swinging clevis pivotally connected thereto, of a horizontally disposed clevis pivotally connected to said swinging clevis by means of a vertically disposed link, an arm extending outward at a right angle from said swinging clevis, a brace connecting said arm with said clevis, a rock-bar pivotally connected to the underside of the plow-beam, a strap iron member connecting one end of said rock-bar with said arm, guide rods connecting said rock-bar with the rear corners of said horizontally disposed clevis, and means for shifting said clevis so as to keep the same in alinement with the draft.

7. A clevis comprising a body portion having a pair of oppositely disposed elongated openings therein, and a plurality of alined perforations adjacent said elongated openings, a J-shaped element removably secured to the upper face of said body portion, and a pair of spaced ears extending rearwardly from said body portion, each of which is provided with an opening.

8. In a device of the class described, the combination with a plow-beam having a swinging clevis pivotally connected to the forward end thereof, of a horizontally disposed clevis having pivotal connection with said swinging clevis, a horizontally disposed rock-bar pivotally connected to the underside of said plow-beam, means connecting said rock-bar with said horizontally disposed clevis, and means for actuating said rock-bar and horizontally disposed clevis in unison.

In testimony whereof we have signed our names to the specification in the presence of two subscribing witnesses.

ADOLPH LUKL.
FRANK WOLF, Jr.

Witnesses:
  J. D. WOLF,
  EMIL PETZ.